United States Patent [19]

Tawara

[11] 4,305,386

[45] Dec. 15, 1981

[54] MOUNTING DEVICE FOR ACCESSORIES OF ENDOSCOPE OCULARS

[75] Inventor: Ikuo Tawara, Hachioji, Japan

[73] Assignee: Olympus Optical Co., Ltd., Tokyo, Japan

[21] Appl. No.: 137,818

[22] Filed: Apr. 4, 1980

[30] Foreign Application Priority Data

Apr. 12, 1979 [JP] Japan ................................. 54-44569

[51] Int. Cl.³ .......................... A61B 1/00; G03B 17/00
[52] U.S. Cl. ......................................... 128/4; 354/62;
403/322; 350/257
[58] Field of Search ..................... 128/4, 6, 8; 354/62,
354/79, 286, 295, 296; 403/316, 311, DIG. 4, 322; 350/257

[56] References Cited

U.S. PATENT DOCUMENTS 4,066,330 1/1978 Jones ............................... 403/322 X
4,182,558 1/1980 Matsuo .............................. 354/62 X Primary Examiner—Stephen C. Pellegrino
Attorney, Agent, or Firm—Frishauf, Holtz, Goodman & Woodward

[57] ABSTRACT

A mounting device for accessories of endoscope oculars comprises a mount body having a central through hole and a hollow cylindrical rim secured to one end of the body. Within the rim there is provided a cavity in the form of a truncated cone for receiving an ocular of an endoscope. Plate cams are rockably supported in axially elongated slits formed in the rim. The plate cams are urged by springs stretched between them and the rim, and their inner faces can contact an ocular inserted in the cavity so loosely that the ocular may be rotated. About the rim a fixing cam ring and a release cam ring are provided rotatably with respect to the mount body. The inner periphery of the fixing cam ring provides such cam surfaces that the fixing cam ring causes the inner faces of the plate cams to push the rear face of the ocular thereby to connecting the ocular immovably to the mounting body when it is rotated in one circumferential direction. The inner periphery of the release cam ring provides such cam surfaces that the release cam ring moves the plate cams from the passage of the ocular when it is rotated in one circumferential direction. When both cam rings are selectively rotated, the ocular is connected immovably to the mounting body, can be rotated with respect to the body or can be disconnected from the body. Therefore, the ocular can be connected to, and disconnected from, the mounting body both easily and unfailingly.

11 Claims, 19 Drawing Figures

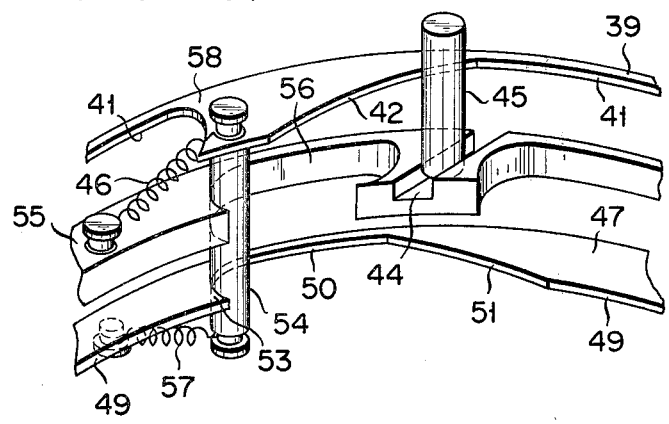
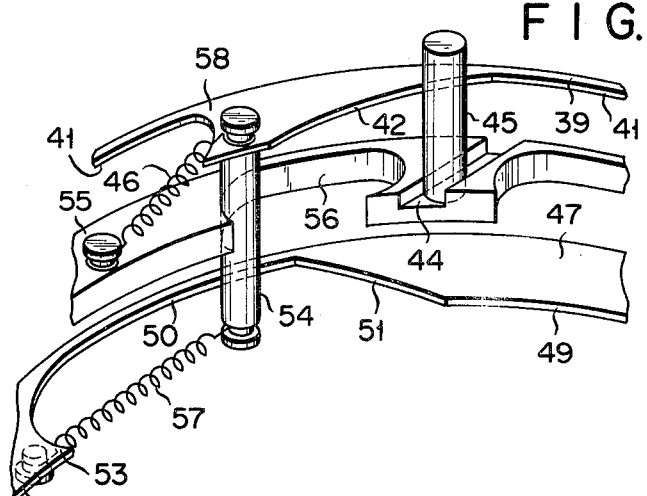
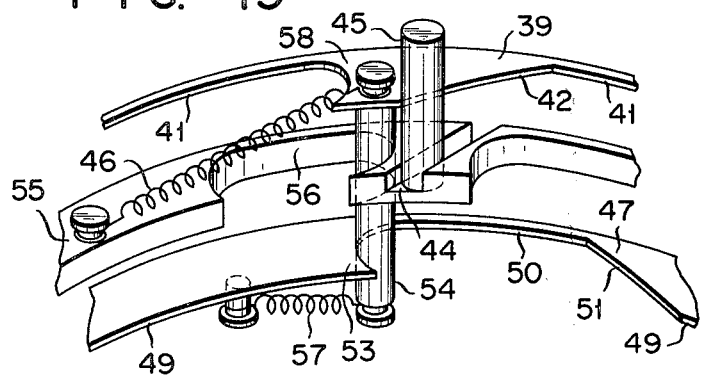

MOUNTING DEVICE FOR ACCESSORIES OF ENDOSCOPE OCULARS

BACKGROUND OF THE INVENTION

This invention relates to a mounting device for connecting the accessories of endoscope oculars, such as a camera and a teaching scope, to the oculars of an endoscope.

Accessories such as a camera and a teaching scope are connected to the ocular of an endoscope by a bayonet device or a friction engagement device.

When the bayonet device is used, the accessory is fixed to the ocular. Thus, if the endoscope is rotated to find out the portion of a coeliac cavity to be observed, the accessory is also rotated together with the endoscope. It gives inconvenience to an operator of the endoscope. When the teaching scope is used, it has the drawback that the image guide bundle is twisted by the rotation.

On the other hand, when the friction engagement device is used, the accessory can freely rotate relative to the endoscope. Suppose that camera is connected to the endoscope with its distal end inserted in a body cavity. But the friction engagement device has the drawback that, if the operator rotates the camera in an attempt to rotate the endoscope thereby to search the portion of the coeliac cavity to be observed the endoscope will not rotate because its distal end portion is held immovable by the friction between it and the body cavity wall, and only the camera if rotated. To rotate the endoscope together with the camera, the operator must hold the camera by one hand and the endoscope by the other hand. This adds to the cumbersome operation of the photographing.

In recent years the endoscopes have been used more often in order to carry out a medical treatment or a small operation in a body cavity. In many cases the operator has to manipulate an endoscope by one hand and handle an medical instrument by the other hand. During examination of the abdominal cavity, for example, the operator manipulates the endoscope by one hand while he operates a probe by the other hand to move an organ in the abdominal cavity. When the photographs are taken while the endoscope is rotated, the camera is also rotated. Thus, it is inconvenient for the operator to work the camera.

As mentioned above, only two types of accessory mounting devices are known, one type securing an accessory immovably to an endoscope and the other type connecting an accessory rotatably to an endoscope. Both types have the above-mentioned drawbacks. In many cases it is desired that an accessory be sometimes fixed to an endoscope and be sometimes rotatably connected to the endoscope. Such being the case, there has been a strong demand for mounting devices which permit an easy and correct operation of an endoscope and its accessories.

SUMMARY OF THE INVENTION

An object of this invention is to provide a mounting device for the accessories of endoscope oculars, which can easily and unfailingly attach accessories to, and detach them from, the endoscope ocular and which can fix the accessories to the ocular and connect them rotatably to the ocular.

A mounting device according to this invention has a cylindrical body having a central through hole and a hollow cylindrical rim connected to the body coaxially with the central hole. The rim has a cavity for receiving an ocular, which has the form of a truncated cone, which is coaxial with the central hole of the body and the diameter of which decreases toward the body. The rim has elongated slits which extend axially of the rim. In the elongated slits plate cams are rotatably supported. Each plate cam has an inner face shaped so as to engage the rear face of an ocular inserted in the cavity and so as to hold the ocular within the cavity, and it is biased by resilient means to push the ocular into the cavity.

A fixing cam ring and a release cam ring surround the rim.

The inner periphery of the fixing cam ring is provided with the same number of cam surfaces as that of the plate cams. Each cam surface consists of an arcuate engagement cam surface portion coaxial with the central hole and an arcuate disengagement cam surface portion coaxial with the central hole and having a radius larger than that of the engagement cam surface portion. The cam surfaces are arranged serially along the inner periphery of the fixing cam ring such that the engagement and disengagement cam surfaces are arranged alternately. When the fixing cam ring is rotated in one circumferential direction, the plate cams are rotated by the respective engagement cam surfaces in the direction in which they are urged by the resilient means, thus firmly clamping the rear face of the ocular and connecting the mounting device immovably to the ocular. On the other hand, when the fixing cam ring is rotated in the opposite direction, the disengagement cams face the respective plate cams to rotate the mounting device relative to the ocular.

The inner periphery of the release cam ring is provided with the same number of cam surfaces as that of the plate cams. Each cam surface consists of an arcuate disengagement cam surface portion concentric with the central hole and an arcuate release cam surface portion decreasing the distance from the axis of the central hole as it goes away from the disengagement cam face portion. The cam surface are arranged serially along the inner periphery of the release cam such that the disengagement and release cam surface portions are arranged alternatively. When the fixing cam ring is rotated to allow its disengagement cam surface portions to face the plate cams and the release cam ring is rotated to permit the inclined release cam surface portions to engage the plate cams, the release cam surface portions rotate the respective plate cams against the resilient means, thereby bringing the plate cams out of the passage of the ocular in the cavity. Consequently, the mounting device can be easily connected to and disconnected from the ocular.

The mounting device can therefore connect an accessory immovably and rotatably to the ocular. Further it can easily and unfailingly connect an accessory to, and disconnect it from, the ocular.

BRIEF DESCRIPTION OF THE DRAWINGS

This invention can be fully understood from the following detailed description with reference to the accompanying drawings in which:

FIGS. 17 to 19 are perspective views of the device, illustrating the positional relationship between the release cam ring and the fixing cam ring when no cam rings function, when only the fixing cam ring functions, and when only the release cam ring functions, respectively.

DETAILED DESCRIPTION OF THE PREFERRED EMBODIMENT

Figure 1:
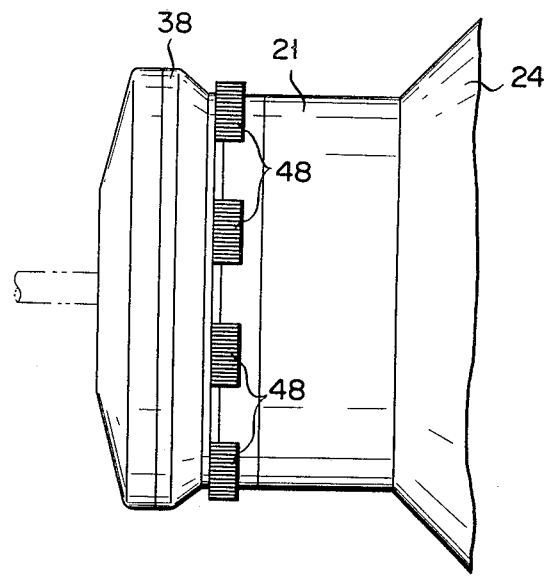
FIG. 1 is a side view of a mounting device according to this invention.
Figure 2:
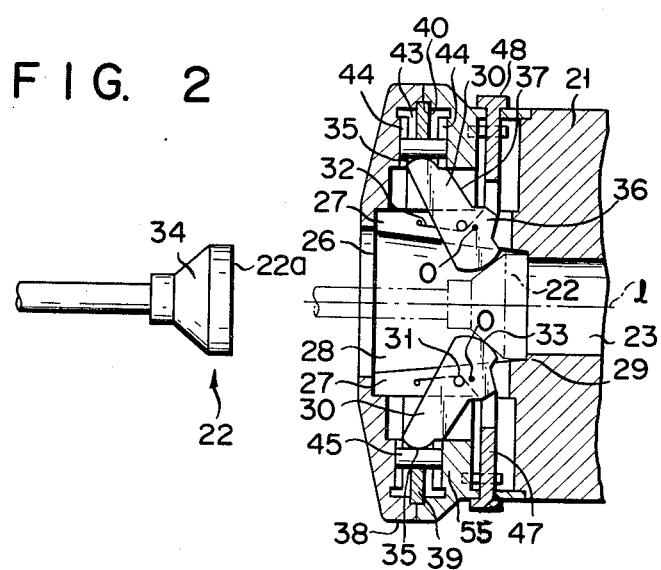
FIG. 2 is a vertical cross sectional view of the device shown in FIG. 1.

As shown in FIGS. 1 and 2, a mounting device for accessories of endoscope oculars has, for example, a cylindrical mount body 21 with a central through hole 23. The diameter of the hole 23 is smaller than the outer diameter of the proximal end 22a of an endoscope ocular 22. Usually, the mounting device is integrally fixed at its one end to an ocular accessory 24 such as a camera or a teaching scope. A hollow cylindrical rim 26 is integrally formed with the other end of the body 21, coaxially aligned with the central through hole 23. The rim 26 has a plurality of axially elongated slits 27, for example, two slits which are formed diametrically opposite. Formed in the rim 26 is a cavity 28 in the shape of a truncated cone with the diameter decreasing towards its inside. Its inner end communicates with the central hole 23 and has a diameter substantially equal to the outer diameter of the proximal end portion 22a of the ocular 22. A shoulder 29 is formed between the central hole 23 and the cavity 28 in the mount body 21 to receive the proximal end portion 22a of the ocular 22 and thus to prevent the end portion 22a from moving in radial directions of the body 21.

Plate cams 30 are provided to extend through the respective elongated slits 26. They are pivoted to the wall of the slits 26 by shafts 31 and each plate cam 30 can rotate in a plane which contains the axis of the rim 26. Each plate cam 30 is urged by a tension spring 32 such that it rotates in the direction in which its inner face 33 is moved towards the axis of the rim 26. The spring 32 is wound about the pin 31 at its central portion, and its one end abuts on the wall of the slit 27 and the other end engages the plate cam 30.

The inner face 33 of the each plate cam 30 is an arcuate cam surface whose center is 0 located between the pin 31 and the inner end of the slit 27. As the plate cams 30 rotate, urged by the springs 32, their inner faces 33 strongly push the conical rear face 34 of the ocular 22. As a result, the proximal end 22a of the ocular 22 abuts on the shoulder 29 of the body 21. Once abutting on the shoulder 29, the ocular 22 would not move radially of the mount body 21.

The outer face 35 of each plate cam 30, which is disposed opposite to the inner face 33 with respect to the pin 31, provide a rounded cam surface. That side of each cam 30 which faces the mount body 21 has a abutment 36 at its intermediate portion.

The rim 26 and the plate cams 30 are disposed within a cam housing 38. The cam housing 38 is secured to the rim 26, and is thus attached to the body 21.

Figure 3:
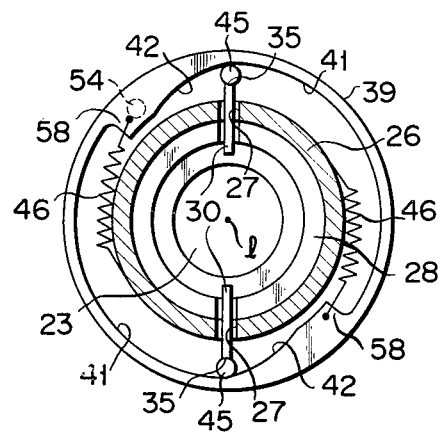
FIG. 3 is a front view of a release cam ring used in the device of FIG. 1, illustrating the positions which a rim and a plate cam take when the release cam ring does not work.
Figure 4:
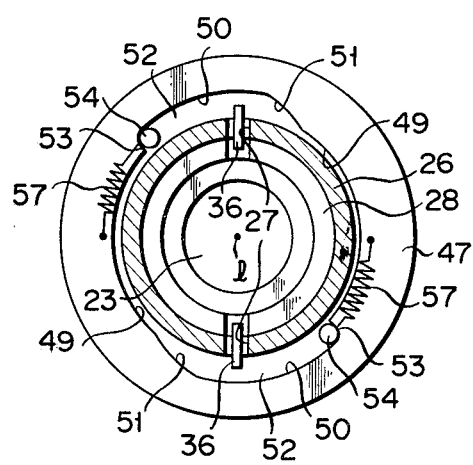
FIG. 4 is a front view of a fixing cam ring used in the device of FIG. 1, illustrating the positions which a rim and a plate cam take when the fixing cam ring does not work.

As shown in FIGS. 2 to 4, a release cam ring 39 is provided within the cam housing 38 so as to surround the outer faces 35 of the plate cams 30. The outer periphery of the release cam ring 39 is fitted in an annular groove 40 formed in the inner wall of the cam housing 38. The inner periphery of the release cam ring 39 provides cam surfaces the number of which is the same as that of the plate cams 30. That is, it provides two cam surfaces in this embodiment. Each cam surface comprises a disengagement cam surface portion 41 and a release cam surface portion 42 which is contiguous with the disengagement cam surface portion 41. The disengagement cam surface portion 41 is arcuate, coaxial with the axis 1 of the cavity 28, central hole 23 and ocular 22. The release cam surface portion 42 is also arcuate decreasing the distance from the axis 1 as goes in the counterclockwise direction as shown in FIG. 3.

The cam housing 38 has an annular chamber 43 which contains the release cam ring 39. In both end walls of the chamber 43 pairs of facing grooves 44 are formed, which extend in the radial direction of the housing 38 and the number of pairs of which is the same as that of the plate cams 30. Rollers 45, the number of which is the same as that of the plate cams 30, are disposed in the annular chamber 43. Each roller 45 has its ends inserted in the paired grooves 44 and can slide in the radial direction of the cam housing 39.

As shown in FIG. 3, the release cam ring 39 is urged to rotate counterclockwise by urging means such as compression coil springs 46. Each compression coil spring 46 is connected at one end to the outer periphery of the rim 26 and at the other end to a stepped portion 58 between the release cam surface portion 42 of one cam surface and the disengagement surface of the adjacent cam surface.

Within the cam housing 38 a fixing cam ring 47 is arranged between the mount body 21 and the release cam ring 39. It is coaxial with the release cam ring 39 and surrounds the projections 36 of the plate cams 30. The fixing cam ring 47 has on its outer periphery a plurality of knurled elements 48 as shown in FIGS. 1 and 2. The projecting elements 48 protrude outside through apertures made in the lateral wall of the cam housing 38. By holding the elements 48 by one hand the operator can rotate the fixing cam ring 47 relative to the body 21.

The inner periphery of the fixing cam ring 47 provides cam surfaces the number of which is the same as that of the plate cams 30. Each cam surface comprises an engagement cam surface portion 49, a disengagement cam surface portion 50 and an inclined cam surface portion 51. The cam surface portions 49, 50 and 51 are all arcuate. The engagement cam surface portion 49 is concentric with the axis 1. The disengagement cam surface portion 50 is concentric with the axis 1 and has a larger radius than the engagement cam surface portion 49. The inclined cam surface portion 51 exists between the cam surface portions 49 and 50 and is continuous with the cam surface portion 49. The disengagement cam surface portion 50 is contiguous with the inclined cam surface portion 51 and extends therefrom in the counterclockwise direction as shown in FIG. 4. Between each disengagement cam surface portion 50 and the outer periphery of the rim 26 there is provided an arcuate gap 52. A stepped portion 53 is defined between the disengagement cam surface portion 50 of one cam surface and the engagement cam surface portion 49 of the adjacent cam surface.

As shown in FIGS. 17 to 19, from each stepped portion 58 of the release cam ring 39 a stop rod 54 extends into the gap 52 through an elongated hole 56 which is formed in a ring wall 55 provided between the cam rings 39 and 47.

The fixing cam ring 47 is urged to rotate counterclockwise by urging means such as compression coil springs 57. Each coil spring 57 is anchored at one end to the stop rod 54 and at the other end to that portion of the cam ring 47 which has the engagement cam surface 49.

Figure 5:
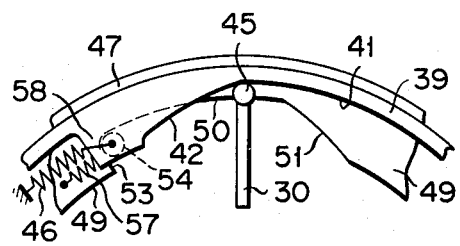
FIG. 5 is a front view of the device, showing the arrangement of the main parts of the release cam ring and fixing cam ring when no cam rings work.

As shown in FIGS. 3 to 7 and 17, when neither the cam ring 49 nor 47 is not operated, the outer face 35 and abutment 36 of each plate cam 30 face the disengagement cam surface portion 41 of the release cam ring 39 and the disengagement cam surface 50 of the fixing cam ring 47, respectively. By means of the spring 32 urges the plate cam 30. The outer end 35 of the plate cam 30 pushes the roller 45 outwardly in the radial direction of the release cam ring 39. Thus, the roller 45 is held in contact with that portion of the cam surface portion 41 which is close to the cam portion 42 of the release cam ring 39, as shown in FIGS. 5 and 17.

Figure 7:
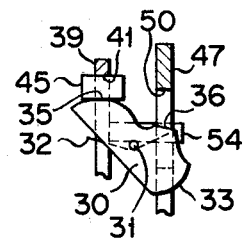
FIG. 7 is a side view of the device, showing the positions which the plate cams, release cam ring and fixing cam ring take when no cam rings work.
Figure 6:
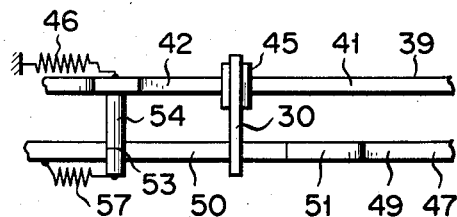
FIG. 6 shows the arrangement shown in FIG. 5 as they are viewed from inside the device.

The fixing cam ring 49 is urged by the coil springs 57 so that its stepped portion 53 abut on the stop rods 54 (FIG. 17). The abutments 36 of the plate cams 30 are spaced from the respective disengagement cam surfaces 50 of the fixing cam ring 49 (FIG. 7).

Figure 8:
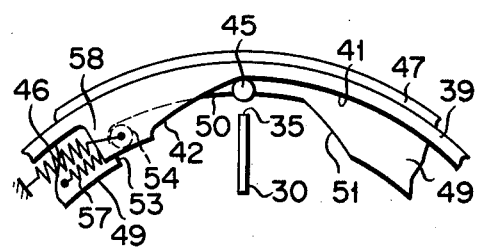
FIG. 8 is a front view of the device with an ocular inserted in its mounting cavity and with no cam rings operated.
Figure 10:
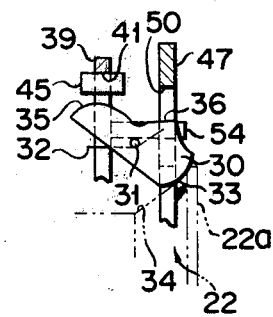
FIG. 10 is a side view of the device, illustrating the positions which the plate cams, release cam ring and fixing cam ring take in the state of FIG. 8.
Figure 9:
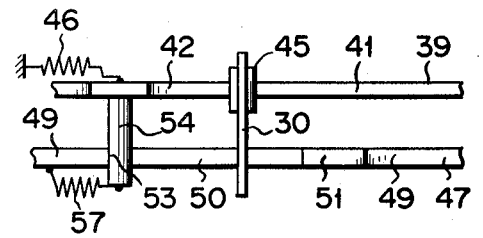
FIG. 9 shows the members shown in FIG. 8 as they are viewed from inside the device.

Referring to FIGS. 8 to 10, when the endoscope ocular 22 is inserted in the cavity 28, its proximal end 22a rotates the plate cams 30 against the springs 32, whereby the ocular 22 is further inserted in the cavity 28. When the proximal end 22a comes into contact with the shoulder 29 of the mount body 21, it goes beyond the inner faces 33 of the plate cams 30. As a result, the plate cams 30 are rotated by the springs 32 until their inner faces 33 abut on the rear face 34 of the ocular 22 as shown in FIG. 10. Since the inner faces 33 of the plate cams 30 are each an arcuate cam surface with its center 0 displaced from the pin 31 toward the mount body 21, the inner faces 33 of the plate cams 30 press the rear face 34 of the ocular 22 by the urging force of the springs 32. Thus, the mounting device can be steadfastly held on the ocular 22. Even if the mounting device is pulled, the spring-biased eccentric inner faces 33 of the cams 30 act on the rear face 34 of the ocular 22 as if they bite into the rear face 34. Thus, the ocular 22 would not be detached from the cavity 28. The springs 32 have such force as will allow the mount body 21 and the ocular 22 to rotate relative to each other.

In this stage, neither the cam ring 39 nor 47 moves relative to each other or with respect to the body 21 as shown in FIGS. 8, 9 and 10. But the plate cams 30 are moved away from the cam rings 39 and 47 as shown in FIG. 10.

Figure 11:
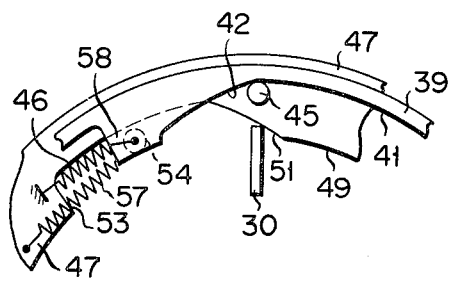
FIG. 11 is a front view of the device showing the positions which the plate cams, release cam ring and fixing cam ring take when only the fixing cam ring functions.
Figure 13:
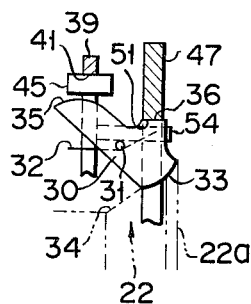
FIG. 13 is a side view of the device, illustrating the positions which the plate cams, release cam ring and fixing cam ring take in the state of FIG. 11.
Figure 12:
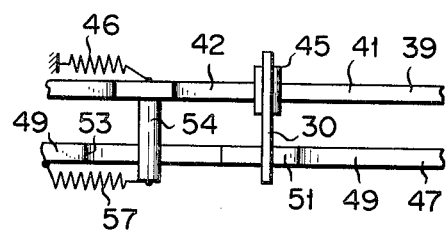
FIG. 12 shows the members shown in FIG. 11 as they are viewed from inside the device.

Referring to FIGS. 11 to 13 and 18, when the fixing cam ring 47 is rotated counterclockwise in FIG. 11 against the springs 57 as illustrated as shown in FIGS. 11 and 12, with the cam ring 37 stationary, the inclined cam surface portions 51 of the fixing cam rings 47 engage the abutments 36 of the plate cams 30 and then push the plate cams 30 in the direction in which they are urged by the springs 32. As a result, the inner faces 33 of the cams 30 clamp the rear face 34 of the ocular 22 very strongly. Consequently, the rear face 22a of the ocular 22 is pushed onto the shoulder 29 of the mount body 21, and the ocular 22 is therefore immovably secured to the mount body 21, as shown in FIG. 13.

Figure 14:
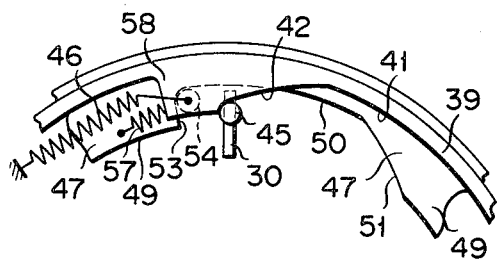
FIG. 14 is a front view of the device, showing the positions which the plate cams, release cam ring and fixing cam ring take when only the release cam ring functions.
Figure 16:
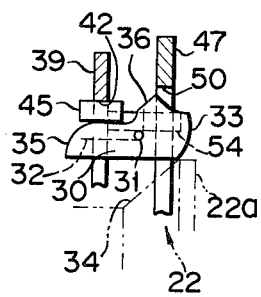
FIG. 16 shows the members shown in FIG. 14 as they are viewed from inside the device.
Figure 15:
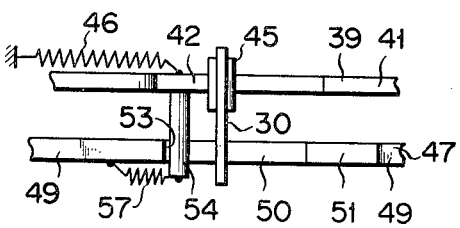
FIG. 15 is a side view of the device, showing the positions which the cam plates, release cam ring and fixing cam ring take in the state of FIG. 14.

Referring to FIGS. 14 to 16 and 19 the fixing cam ring 47 is rotated clockwise in FIG. 14, until the abutments 36 of the plate cams 30 face the disengagement cam surface portions 50 of the fixing cam ring 47, and the stepped portions 53 of the cam ring 47 contact the stop rods 54 again. When the cam ring 47 is further rotated clockwise in FIG. 14, the release cam ring 39 is rotated clockwise, too. As a result, the rollers 45 move on the release cam surface 42 of the release cam ring 39 toward the axis 1 (FIGS. 1 and 2). As the rollers 45 are moved toward the axis 1, they push the outer faces 35 of the plate cams 30 toward the axis 1, thus rotating the cams 30 against the springs 32. The plate cams 30 are therefore located out of the passage of the ocular 22 in the cavity 28 as illustrated in FIG. 15. Once the cams 30 have taken this position, the mounting device can be easily disconnected from the ocular 22.

After the mounting device has been disconnected from the ocular 22, the fixing cam ring 47 may be rotated and brought back to the position shown in FIGS. 3 to 7 and FIG. 17. Then, the mounting device can be connected again to the ocular 22.

As described above, the rotation of the fixing cam ring 47 and the release cam ring 39 allows for the easy and steadyfast connection of the mounting device to and disconnection of the same from the ocular 22. In addition, by rotating the cam rings 39 and 47 it is possible to connect the ocular 22 immovably or rotatably to the mounting device, both easily and unfailingly.

What is claimed is:

1. A mounting device for connecting accessories to an ocular of an endoscope, comprising:
   an accessory mount body having a lateral wall, two opposite ends and a central through hole opening at one of said ends of the mounted body;

a truncated conical cavity formed in said other end of the mount body for receiving an ocular having a proximal end and a rear face and coaxial with the central hole, said cavity opening at the other end of the mount body and having an inner diameter progressively decreasing toward said one end of the mount body;

elongated slits formed in the lateral wall of that portion of the other end of the mount body which surrounds the cavity and extending along the central hole;

plate cams rockably supported in said elongated slits by shafts and each having an inner face which is to come into contact with the rear face of the ocular inserted in the cavity;

reslient urging means for urging said place cams to allow the inner faces of the plate cams to press the rear face of the ocular;

a fixing cam ring surrounding the other end of the mount body and rotatable with respect to the mount body, said fixing cam ring having an inner periphery provided with the same number of cam surfaces as the plate cams for engaging the inner faces of the plate cams to allow the inner faces to push the rear face of the ocular toward said one end of the mount body so as to clamp the mount body to the ocular when the fixing cam ring is rotated in one circumferential direction thereof and for disengaging the inner faces of the plate cams from the rear end of the ocular when the fixing cam ring is rotated in the opposite circumferential direction to said one circumferential direction; and a release cam ring surrounding the other end of the mount body and rotatable with respect to the mount body, said release cam ring having an inner periphery provided with the same number of cam surfaces as the plate cams for rotating the plate cams against the resilient urging means out of a passage of the ocular in the cavity when the release cam ring is rotated in one circumferential direction thereof and for being disengaged from the cam plates when the release cam ring is rotated in the opposite circumferential direction to said one circumferential direction of the release cam ring.

2. The mounting device according to claim 1, wherein each of said cam surfaces of said fixing cam ring comprises an arcuate cam surface portion for pushing the corresponding plate cam against the resilient urging means, an arcuate disengagement cam surface portion having a larger radius than a radius of the engagement cam surface portion for releasing the plate cam, said disengagement cam surface portion being disposed adjacent downstream of said one circumferential direction of the fixing cam ring, and an inclined cam surface portion continuous with the engagement and disengagement cam surface portions; and each of said cam surfaces of said release cam ring comprises an arcuate disengagement cam surface portion for releasing the corresponding plate cam and an inclined releasing cam surface portion progressively extending inward of the release cam ring as going in said opposite circumferential direction of the release cam ring for moving the plate cam out of the passage of the ocular in the cavity against the resilient urging means.

3. The mounting device according to claim 2, wherein said one circumferential direction of said fixing cam ring and said one circumferential direction of said release can ring are opposite to each other.

4. The mounting device according to claim 3, wherein said portion of the other end of the mount body which surrounds the cavity is a hollow cylindrical rim concentric with the central hole.

5. A mounting device according to claim 4, wherein said resilient urging means are compression coil springs.

6. The mounting device according to claim 4, wherein said release cam ring has stepped portions defined between the release cam surface portions and the disengagement cam surface portions of the adjacent cam surfaces of the release cam ring; said fixing cam ring has stepped portions defined between the disengagement cam surface portions and the engagement cam surface portions of the adjacent cam surfaces of the fixing cam ring; each of said stepped portions of the release cam ring has connected therewith a stop rod extending between the rim and the corresponding disengagement cam surface portion and adapted to abut on the corresponding stepped portion of the fixing cam ring; said release cam ring is provided with a releasing cam urging means for urging the release cam ring in said opposite direction of the release cam ring; and said fixing cam ring is provided with release cam ring urging means for urging the fixing cam ring in said one direction of said fixing cam ring.

7. The mounting device according to claim 6, wherein said inner face of each of said plate cams is an arcuate face with a center thereof disposed closer to said one end of the mount body than the shaft of the corresponding plate cam.

8. The mounting device according to claim 7, wherein said fixing cam ring is disposed closer to said one end of said mount body than said release cam ring; and each of said plate cams has an outer face which is disposed opposite to the inner face with respect to the shaft and which is adapted to contact the release cam surface portion of said release cam ring, and a lateral edge which is adapted to contact the engagement cam surface portion of fixing cam ring.

9. The mounting device according to claim 8, wherein said lateral edge of each plate cam has an abutment which is adapted to contact the corresponding engagement cam surface portion of the fixing cam ring.

10. The mounting device according to claim 9, further comprising a cam housing secured to the mount body, covering both the release cam ring and the fixing cam ring, and having an annular cam chamber accommodating said release cam ring and grooves opening to said cam chamber, aligned with the outer faces of the plate cams and extending radially of said cam housing; and rollers extending between the cam surfaces of said release cam ring and the outer faces of the plate cams, with both ends of the rollers inserted respectively in said grooves.

11. The mounting device according to claim 9, wherein said fixing cam ring has an outer periphery and projecting elements formed on the outer periphery and extending outside the cam housing so as to be held by hand when said fixing cam ring is rotated.

* * * * *